United States Patent
Sun et al.

(10) Patent No.: US 12,104,803 B2
(45) Date of Patent: Oct. 1, 2024

(54) METHOD, APPARATUS, AND STORAGE MEDIUM FOR CONTROLLING HEATING SYSTEM

(71) Applicant: Tsinghua University, Beijing (CN)

(72) Inventors: Hongbin Sun, Beijing (CN); Qinglai Guo, Beijing (CN); Bin Wang, Beijing (CN); Guanxiong Yin, Beijing (CN); Tongtian Sheng, Beijing (CN); Zhaoguang Pan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 778 days.

(21) Appl. No.: 17/152,041

(22) Filed: Jan. 19, 2021

(65) Prior Publication Data

US 2021/0141405 A1    May 13, 2021

Related U.S. Application Data

(63) Continuation of application No. PCT/CN2018/112619, filed on Oct. 30, 2018.

(30) Foreign Application Priority Data

Jul. 20, 2018 (CN) .......................... 201810805229.0

(51) Int. Cl.
*F24D 18/00* (2022.01)
*G05D 23/19* (2006.01)
(Continued)

(52) U.S. Cl.
CPC ......... *F24D 18/00* (2022.01); *G05D 23/1934* (2013.01); *G06F 30/20* (2020.01); *G06F 2119/08* (2020.01)

(58) Field of Classification Search
None
See application file for complete search history.

(56) References Cited

U.S. PATENT DOCUMENTS

2013/0238294 A1* 9/2013 Legbedji ................ G06Q 50/06
                                                      703/2
2016/0223214 A1* 8/2016 Turner ..................... F24F 11/46
(Continued)

FOREIGN PATENT DOCUMENTS

CN    106056251 A  * 10/2016
CN    106647329 A  *  5/2017 ............ G05B 17/02
JP    2009250454 A * 10/2009

OTHER PUBLICATIONS

WIPO, ISR for PCT/CN2018/112619, Mar. 28, 2019.

*Primary Examiner* — David Earl Ogg
(74) *Attorney, Agent, or Firm* — Hodgson Russ LLP

(57) ABSTRACT

The disclosure provides a method, an apparatus, and a storage medium for controlling heating system. The method includes: establishing an objective function and constraints for estimating system parameters of the heating system, in which the heating system includes nodes, pipelines and equivalent branches, the equivalent branch is configured to represent a heating resource or a heating load in the heating system, the system parameters include a resistance coefficient of each of the pipelines and equivalent branches, and a heat dissipation coefficient of each of the pipelines; solving the objective function based on the constraints to obtain the system parameters; modeling the heating system based on the obtained system parameters to obtain control parameters of the heating system; and controlling the heating system based on the control parameters.

14 Claims, 1 Drawing Sheet

(51) Int. Cl.
*G06F 30/20* (2020.01)
*G06F 119/08* (2020.01)

(56) References Cited

U.S. PATENT DOCUMENTS

2016/0313751 A1* 10/2016 Risbeck .................. G05B 15/02
2018/0372362 A1* 12/2018 Turney ..................... H02J 3/14

* cited by examiner

METHOD, APPARATUS, AND STORAGE MEDIUM FOR CONTROLLING HEATING SYSTEM

CROSS REFERENCE TO RELATED APPLICATIONS

This application is a continuation of International Application No. PCT/CN2018/112619 filed on Oct. 30, 2018, which claims priority to Chinese Patent Application No. 201810805229.0 filed on Jul. 20, 2018, the entire contents of which are incorporated by reference herein.

FIELD

The disclosure relates to a solution for controlling a heating system, which belongs to the field of operation and control technologies for a combined heat and power system.

BACKGROUND

There is uncertainty in parameters for modeling and controlling the heating system.

For example, the flow capacity of the pipeline, which also refers to the resistance coefficient, will change due to various factors. It needs to calculate the actual resistance coefficient through an empirical formula during modeling and controlling the heating system because the actual resistance coefficient is often different from the corresponding value given by the manufacturer, for example, the resistance coefficient may change due to variations in various factors such as pipeline operating time, pipeline diameter, pipeline material, heating medium, and inner wall corrosion. This uncertainty poses a challenge to the process of modeling and controlling the heating system.

For another example, the heat dissipation coefficient in modeling and controlling the heating system also employs the empirical value. However, the actual heat dissipation coefficient is affected by the environment, which becomes another important source of uncertainty, and is also not conducive to the process of modeling and controlling the heating system.

SUMMARY

According to a first aspect of embodiments of the disclosure, there is provided a method for controlling a heating system. The method includes: establishing an objective function and constraints for estimating system parameters of the heating system, in which the heating system includes nodes, pipelines and equivalent branches, the equivalent branch is configured to represent a heating resource or a heating load in the heating system, the system parameters include a resistance coefficient of each of the pipelines and equivalent branches, and a heat dissipation coefficient of each of the pipelines; solving the objective function based on the constraints to obtain the system parameters; modeling the heating system based on the obtained system parameters to obtain control parameters of the heating system; and controlling the heating system based on the control parameters.

According to a second aspect of embodiments of the disclosure, there is provided an apparatus for controlling a heating system. The apparatus includes a processor; and a memory for storing instructions executable by the processor. The processor is configured to carry out the above method.

According to a third aspect of embodiments of the disclosure, there is provided a non-transitory computer-readable storage medium having stored therein instructions that, when executed by a processor of a terminal, causes the terminal to perform the above method.

BRIEF DESCRIPTION OF THE DRAWINGS

The accompanying drawings, which are incorporated in and constitute a part of this specification, illustrate embodiments consistent with the disclosure and, together with the description, explain the principles of the disclosure.

DETAILED DESCRIPTION

The disclosure provides a solution for controlling a heating system, which calculates system parameters of the heating system such as the resistance coefficient of pipelines, heating resources, and heating loads, and the heat dissipation coefficient of the pipelines, and models and further controls the heating system based on the calculated system parameters. The system parameters are calculated in the disclosure by considering dynamic characteristics of the pipelines in the heating system and moving horizon estimation of a continuous dynamic adjustment process of the heating system, which are more accurate for modeling and controlling the heating system.

Figure 1:
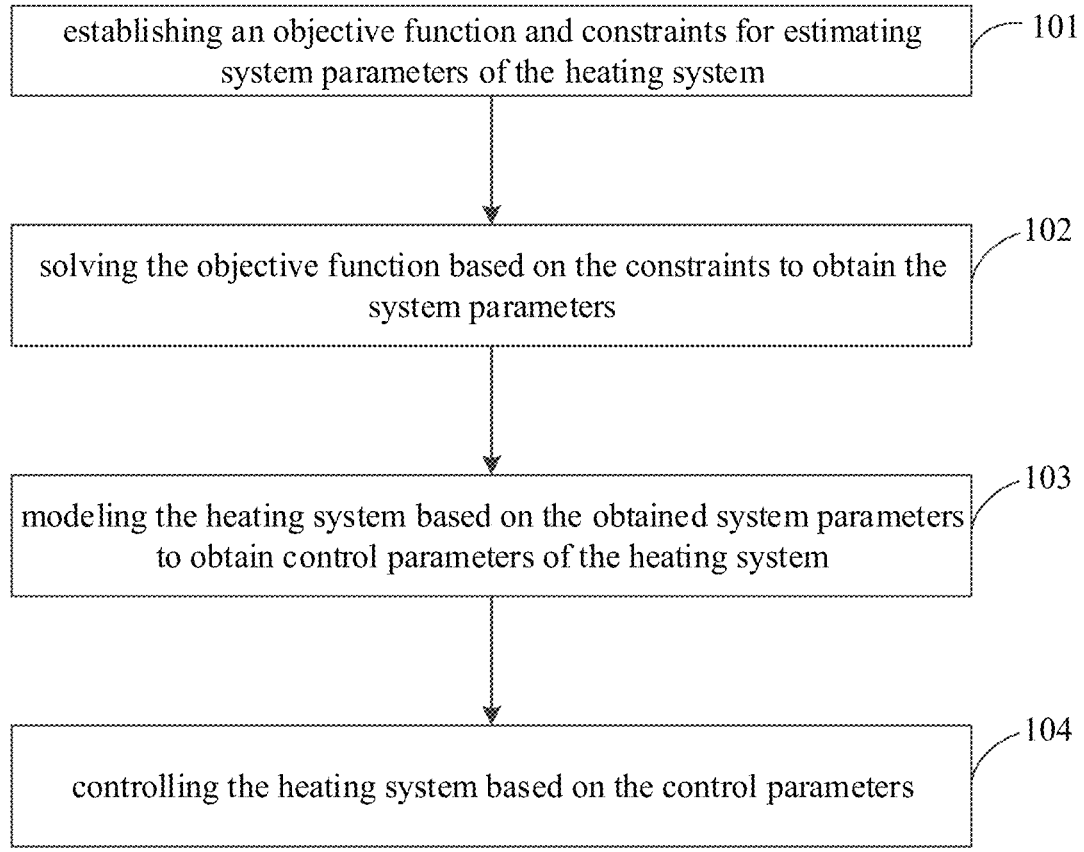
FIG. 1 is a flowchart illustrating a method for controlling a heating system, according to some embodiments.

FIG. 1 is a flowchart illustrating a method for controlling a heating system, according to some embodiments. As illustrated in FIG. 1, the method may include the following actions.

At block 101, an objective function and constraints for estimating system parameters of the heating system are established, in which the heating system includes nodes, pipelines and equivalent branches; the equivalent branch is configured to represent a heating resource or a heating load in the heating system; the system parameters include a resistance coefficient of each of the pipelines and equivalent branches; and a heat dissipation coefficient of each of the pipelines.

At block 102, the objective function is solved based on the constraints to obtain the system parameters.

At block 103, the heating system is modeled based on the obtained system parameters to obtain control parameters of the heating system.

At block 104, the heating system is controlled based on the control parameters.

The solution will be described in detail as follows.

(1) Operation data of the heating system may be obtained from a data collection and monitoring center in the heating system. The operation data may range from moment $t_1$ to moment $t_n$, and have an interval of $\Delta t$. The operation data may include: a pressure H of each node in the heating system, a flow m of a branch between any two nodes (the branch between any two nodes herein is the pipeline or the equivalent branch), a head end temperature $T_f$ and a tail end temperature $T_t$ of the branch between any two nodes, and a thermal power $\phi^q$ of a connecting branch (the connecting branch herein is the equivalent branch), in which a heating source and a heating load in the heating system each is equivalent to the connecting branch, and the superscript q represents the connecting branch, and the superscript p represents hereafter the pipeline.

The interval of Δt is preset, which is an integer multiple of the sampling interval.

The operation data forms the column vector $z_h$ of observed values of n moments.

(2) The discrete difference form of internal temperature states of each pipeline in the heating system is established.

For the pipelines numbered as b=1, 2, 3, ..., Y in the heating system, each pipeline is divided into $Z^b$ segments based on a volume of length Δx. The internal state points in each pipeline are numbered as i=0, 1, 2, 3, ..., $Z^b$. To ensure the stability of the discrete difference form, the value of Δx needs to satisfy a Courant-Friedrichs-Lewy condition, namely:

$$|r| = \left| \frac{m^p(t)}{\rho \cdot S} \cdot \frac{\Delta t}{\Delta x} \right| \leq 1,$$

where,
- r represents a grid ratio of the discrete difference form,
- $m^p(t)$ represents a flow through the pipeline at moment t,
- ρ represents a density of a heating medium, which is obtained from a fluid physical parameter table,
- S represents a cross sectional area of the branch in the heating system, which is obtained from the corresponding pipeline manual.

(3) The parameters may be estimated under constant flow control using the moving horizon estimation method.

(3-1) The state variables from moment $t_1$ to moment $t_n$ may be divided into s time windows, in which each time window includes state information of I moments, i.e., I=n/s.

(3-2) For moment t in any time window, all the variables to be estimated in the heating system form a column vector $x_h(t)$, and the column vector $x_h(t)$ includes a state column vector $x_{state}(t)$ and a parameter column vector $x_{para}$. The state column vector $x_{state}(t)$ includes a flow m(t) of each of the pipelines and equivalent branches in the heating system, a pressure H(t) of each node in the heating system, and temperatures $T_i^b(t)$, i=0, 1, 2, ..., $Z^b$ of each of the pipelines in the heating system. The parameter column vector $x_{para}$ includes a resistance coefficient K(t) of each of the pipelines and equivalent branches, and a heat dissipation coefficient $\lambda^p$ of each pipeline, in which the superscript p represents the branch including a water supply branch and a water return branch.

(3-3) A measurement function ƒ (x) is established for describing the relationship between state variables, parameter variables and the corresponding observed values.

ƒ (x)=ƒ ($x_h(t)$), ƒ ($x_h(t)$) is a load flow equation of the heating system.

The load flow equation of the heating system may include a branch pressure loss equation and a branch thermal power equation:

$$A^T H(t) = \Delta H(t) - H_p(t),$$

$$\phi^q(t) = C_p m^q(t)(T_f^q(t) - T_t^q(t)),$$

where,
- $A^T$ represents a transposition of a node-branch association matrix A,
- ΔH(t) represents a column vector formed by a pressure loss of each of the pipelines and equivalent branches in the heating system at moment t, in which ΔH(t)=K·m (t)·|m(t)|, and K represents a column vector formed by a resistance coefficient of each of the pipelines and equivalent branches in the heating system,
- $H_p(t)$ represents a column vector formed by a pump head of each of the pipelines and equivalent branches in the heating system at moment t, in which $H_p(t)=a(m_p(t))^2+bm_p(t)+c$, a, b, and c are pump parameters and obtained from the product nameplate, $m_p(t)$ represents a flow of the branch where the pump is located,
- $\phi^q(t)$ represents the thermal power of the connecting branch at moment t, in which the superscript q represents the connecting branch, the thermal power of the heating source is positive, and the thermal power of the heating load is positive,
- $C_p$ represents a specific heat capacity of the heating medium, which is obtained from the fluid physical parameter table,
- $m^q(t)$ represents a flow of the connecting branch at moment t,
- $T_f^q(t)$ represents a head end temperature of the connecting branch at moment t, and
- $T_t^q(t)$ represents a tail end temperature of the connecting branch at moment t.

(4) An objective function for estimating steady-state parameters of the heating system may be established based on operating data obtained at (1) as follows:

$$\min J(x_h(t)) = \min \sum_{t=t_{D-1}}^{t_{D-1}} \{[z_h(t) - f(x_h(t))]^T W [z_h(t) - f(x_h(t))]\}$$

where,
- W represents a covariance matrix of the observed values,
- the superscript T represents a matrix transposition,
- $J(x_h(t))$ represents an expression of the objective function,
- D represents a time window, and
- I represents a size of the time window.

(5) Constraints under constant flow control of the heating system may be established, which are denoted as $c(x_h(t))$.

The constraints may include the following.

(5-1) A flow continuity constraint for all nodes in the heating system may be expressed in the following matrix form:

$$AM(t)=0$$

where,
- M(t) represents a column vector formed by the flow of all pipelines and equivalent branches,
- the water supply branch and the water return branch are uniformly equivalent to the ordinary branch denoted by the superscript p,
- the connecting branch is equivalent to the special branch denoted by the superscript q,
- M(t) is denoted as:

$$M(t) = \begin{bmatrix} M^p(t) \\ M^q(t) \end{bmatrix}$$

where,
- $M^p(t)$ represents a column sub vector formed by the flow of all ordinary branch at moment t,
- $M^q(t)$ represents a column sub vector formed by the flow of all special branch at moment t.

(5-2) A temperature mixing constraint for all nodes in the heating system may be expressed in the following formula of:

$$(\Sigma m_{out}(t))T_n(t) = \Sigma(m_{in}(t)T_{in}(t))$$

where, $m_{out}(t)$ represents a flow of the branch where the heating medium flows out of a corresponding node at moment t, $m_{in}(t)$ represents a flow of the branch where the heating medium flows into the corresponding node at moment t, $T_n(t)$ represents a temperature of the heating medium of different branches after mixing at the corresponding node at moment t, $T_{in}(t)$ represents a temperature of the heating medium of different branches before mixing at the corresponding node at moment t, The tail end temperatures $T_{out}(t)$ of different branches may replace the $T_{in}(t)$. Therefore, the temperature mixing constraint for all nodes in the heating system may be expressed by the following matrix form:

$$\text{diag}(A_f M(t))T_n(t) = A_t \, \text{diag}(M(t))T_{out}(t)$$

where, $A_f$ represents a positive node-branch association matrix,
$A_t$ represents a negative node-branch association matrix,
diag(•) represents a diagonal, namely:

$$A_{fij} = \begin{cases} 1 & \text{node } i \text{ is a head node of pipeline or branch } j \\ 0 & \text{node } i \text{ is not a head node of pipeline or branch } j \end{cases}$$

$i = 1, 2, \ldots, N; j = 1, 2, \ldots, B$ $$A_{tij} = \begin{cases} 1 & \text{node } i \text{ is a tail node of pipeline orb ranch } j \\ 0 & \text{node } i \text{ is not a tail node of pipeline or branch } j \end{cases}$$

$i = 1, 2, \ldots, N; j = 1, 2, \ldots, B$

N represents the number of the nodes in the heating system,

B represents the number of the pipelines and equivalent branches in the heating system.

(5-3) A temperature transfer relationship constraint for the temperature state variables inside the pipeline may be expressed in the following formula of:

$$T_{i+1}^b(t) - T_a = \frac{1}{1 + a\Delta t}\left[(1-r) \cdot \left(T_{i+1}^b(t-1) - T_a\right) + r\left(T_i^b(t-1) - T_a\right)\right]$$

$(i = 1, 2, 3, \ldots, Z^b; b = 1, 2, 3, \ldots, Y)$ $$a = \frac{\lambda}{\rho \cdot C_p \cdot S}$$

where, $T_{i+1}^b(t)$ represents a temperature of a pipeline numbered as b at a state point i at moment t+1, $T_a$ represents an ambient temperature, $T_i^b(t)$ represents a temperature of a pipeline numbered as b at a state point i at moment t, $T_0^b(t)$ represents a temperature of a pipeline numbered as b at a head end at moment t, $T_{Z^b}^b(t)$ represents a temperature of a pipeline numbered as b at a tail end at moment t, l represents a length of the branch in the heating system, λ represents a heat dissipation coefficient of the ordinary branch, i.e., the pipeline in the heating system, which is the quantity to be estimated.

At the same time, for the first time window, a value of t may include $t_2, t_3, \ldots, t_l$. For a subsequent $n^{th}$ time window, a value of t may include $t_{1+nI}, t_{2+nI}, t_{3+nI}, \ldots, t_{l+nI}$.

(6) Any one of a trust region reflective algorithm, an active set algorithm, an interior point method or a sequence quadratic programming algorithm (SQP) may be employed to solve the optimization problem including the objective function of the above (4) and the constraints at the above (5) under the maximum number of iterations and the given iteration accuracy.

The fmincon function can choose four optimization algorithms to solve the problem, and $x_{para}$ is a estimated result of the parameters of the heating system within a time window.

(7) s time windows may traverse and actions at (4)-(6) are repeated. Then for a continuous quality adjustment operation process, a set of s estimated results may be obtained, i.e., $x_{para,1}, x_{para,2}, \ldots, x_{para,s}$.

The average of the set of s estimated results may be obtained to obtain the final estimation result, namely:

$$x_{para,final} = \frac{1}{s} \times (x_{para,1} + x_{para,2} + \ldots + x_{para,s}).$$

The method in the disclosure has the following advantages.

The method is based on the principle of rolling time domain estimation, and establishes a method for estimating the dynamic system parameters of the heating system, which comprehensively considers the resistance coefficient (pipe inner wall roughness) in hydraulic conditions and the heat dissipation coefficient in thermal conditions. The dynamic transfer process is modeled, taking into account the delay effect in the heating system. The method may obtain more accurate parameters. Furthermore, the method can also accurately describe the temperature distribution of pipelines in the heating system, which is impossible for steady state parameter estimation and steady state estimation.

Figure 2:
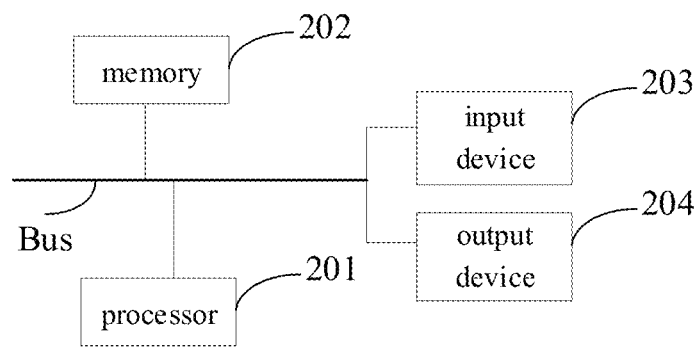
FIG. 2 is a block diagram illustrating an apparatus for controlling a heating system, according to some embodiments.

FIG. 2 is a block diagram illustrating a load flow calculation apparatus for a heating system considering coefficient range of heat dispersion, according to some embodiments. The apparatus may be intended to represent various forms of digital computers, such as laptop computers, desktop computers, workbenches, personal digital assistants, mainframe computers, and other suitable computers. The apparatus may also represent various forms of mobile devices, such as personal digital processing, cellular phones, smart phones, wearable devices, and other similar computing devices. The components shown here, their connections and relations, and their functions are merely examples, and are not intended to limit to the implementation of the disclosure described and/or required herein.

As illustrated in FIG. 2, the computer includes: one or more processors 201, a memory 202, and interfaces for connecting various components, including high-speed interfaces and low-speed interfaces. The various components are interconnected using different buses and can be mounted on a common mainboard or otherwise installed as required. The processor may process instructions executed within the computer, including instructions stored in the memory or on the memory to display graphical information of the GUI (Graphical User Interface) on an external input/output device such as a display device coupled to the interface. In other embodiments, a plurality of processors and/or buses can be used with a plurality of memories and processors, if desired. Similarly, a plurality of computers can be connected, each providing some of the necessary operations. A processor 201 is taken as an example in FIG. 2.

The memory 202 is a non-transitory computer-readable storage medium according to the disclosure. The memory stores instructions executable by at least one processor, so that the at least one processor executes the above method. The non-transitory computer-readable storage medium of the disclosure stores computer instructions that are configured to cause a computer to execute the method (the method as illustrated in FIG. 1).

As the non-transitory computer-readable storage medium, the memory 202 is configured to store non-transitory software programs, non-transitory computer executable programs and modules, such as program instructions/modules corresponding to the above method. The processor 201 executes various functional applications and data processing of the computer by running non-transitory software programs, instructions, and modules stored in the memory 202, that is, implementing the above method in the foregoing embodiment of FIG. 1.

The memory 202 may include a storage program area and a storage data area, where the storage program area may store an operating system and application programs required for at least one function. The storage data area may store data created according to the use of the computer, and the like. In addition, the memory 202 may include a high-speed random-access memory, and a non-transitory memory, such as at least one magnetic disk storage device, a flash memory device, or other non-transitory solid-state storage device. In some embodiments, the memory 202 may optionally include a memory remotely disposed with respect to the processor 201, and these remote memories may be connected to the computer through a network. Examples of the above network include, but are not limited to, the Internet, an intranet, a local area network, a mobile communication network, and combinations thereof.

The computer may further include an input device 203 and an output device 204. The processor 201, the memory 202, the input device 203, and the output device 204 may be connected through a bus or in other manners. In FIG. 2, the connection through the bus is taken as an example.

The input device 203 may receive inputted numeric or character information, and generate key signal inputs related to user settings and function control of the computer, such as a touch screen, a keypad, a mouse, a trackpad, a touchpad, an indication rod, one or more mouse buttons, trackballs, joysticks and other input devices. The output device 204 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for controlling a heating system, comprising:
   establishing an objective function and constraints for estimating system parameters of the heating system, in which the heating system comprises nodes, pipelines and equivalent branches, the equivalent branch is configured to represent a heating resource or a heating load in the heating system, the system parameters comprise a resistance coefficient of each of the pipelines and equivalent branches, and a heat dissipation coefficient of each of the pipelines;

solving the objective function based on the constraints to obtain the system parameters;

modeling the heating system based on the obtained system parameters to obtain control parameters of the heating system; and controlling the heating system based on the control parameters;

wherein establishing the objective function by a formula of:

$$\min J(x_h(t)) = \min \sum_{t=t_{D-1}}^{t_{D-1}} \{[z_h(t) - f(x_h(t))]^T W[z_h(t) - f(x_h(t))]\}$$

where, $J(x_h(t))$ represents the objective function at moment t, $x_h(t)$ represents a column vector of state variables in the heating system and the system parameters at moment t, wherein h represents the state variables and the system parameters, $z_h(t)$ represents a column vector of observed values of the state variables and the system parameters at moment t, $f(x_h(t))$ represents a column vector of estimated values of the state variables and the system parameters at moment t, D represents a time window, I represents a size of the time window, T represents a matrix transposition operation, and W represents a covariance matrix of the observed values, where $f(x_h(t))$ is denoted by a formula of:

$A^T H(t) = \Delta H(t) - H_p(t)$, $\phi^q(t) = C_p m^q(t)(T_f^q(t) - T_t^q(t))$, where, $A^T$ represents a transposition of a node-branch association matrix A, H(t) represents a column vector formed by a pressure of each node at moment t, $\Delta H(t)$ represents a column vector formed by a pressure loss of each of the pipelines and equivalent branches at moment t, in which $\Delta H(t) = K \cdot m(t) \cdot |m(t)|$, K represents a column vector formed by the resistance coefficient of each of the pipelines and equivalent branches, m(t) represents a column vector formed by a flow of each of the pipelines and equivalent branches at moment t, |m(t)| represents a column vector formed by an absolute value of the flow of each of the pipelines and equivalent branches at moment t, $H_p(t)$ represents a column vector formed by a pump head of each of the pipelines and equivalent branches at moment t, in which $H_p(t) = a(m_p(t))^2 + bm_p(t) + c$, a, b, and c are pump parameters, $m_p(t)$ represents a flow of the branch where the pump is located, wherein p represents the branch where the pump is located, $\phi^q(t)$ represents a thermal power of each equivalent branch at moment t, in which the superscript q represents the equivalent branch, the thermal power of the heating source is positive, and the thermal power of the heating load is positive, $C_p$ represents a specific heat capacity of a heating medium flowing in the heating system, $m^q(t)$ represents a flow of each equivalent branch at moment t, $T_f^q(t)$ represents a head end temperature of each equivalent branch at moment t, and $T_t^q(t)$ represents a tail end temperature of each equivalent branch at moment t;

wherein the control parameters of the heating system comprise a flow of each of the pipelines and equivalent branches at a control moment, a thermal power of each of the pipelines and equivalent branches at a control moment, and temperature of each of the pipelines and equivalent branches at a control moment.

2. The method of claim 1, wherein:

the column vector $x_h(t)$ comprises a state column vector $x_{state}(t)$ and a parameter column vector $x_{para}$, the state column vector $x_{state}(t)$ comprises a flow m(t) of each of the pipelines and equivalent branches, a pressure H(t) of each node, and temperatures $T_i^b(t)$, i=0, 1, 2, ..., $Z^b$ of each of the pipelines, wherein superscript b represents a pipeline numbering reference, each pipeline b is divided into $Z^b$ segments as internal state points, the internal state points in each pipeline b are numbered as i=0, 1, 2, 3, ..., $Z^b$, and $Z^b$ represents a number of state points in each pipeline b, and the parameter column vector $x_{para}$ comprises the resistance coefficient K(t) of each of the pipelines and equivalent branches and the heat dissipation coefficient $\lambda^p$ of branches including water supply branches and water return branches, wherein superscript p represents a branch including a water supply branch and a water return branch.

3. The method of claim 2, wherein the constraints comprise a flow continuity constraint for the nodes, a temperature mixing constraint for the nodes, and a temperature transfer relationship constraint.

4. The method of claim 3, where the flow continuity constraint is denoted as:

$AM(t) = 0$ where, M(t) represents a column vector formed by the flow of the pipelines and equivalent branches, $$M(t) = \begin{bmatrix} M^p(t) \\ M^q(t) \end{bmatrix}$$

$M^p(t)$ represents a column sub vector formed by the flow of the pipelines at moment t, $M^q(t)$ represents a column sub vector formed by the flow of the equivalent branches at moment t.

5. The method of claim 3, wherein the temperature mixing constraint is denoted as:

$(\Sigma m_{out}(t)) T_n(t) = \Sigma(m_{in}(t) T_{in}(t))$ where, $m_{out}(t)$ represents a flow of each of the pipelines and equivalent branches where the heating medium flows out of a corresponding node at moment t, $m_{in}(t)$ represents a flow of each of the pipelines and equivalent branches where the heating medium flows into the corresponding node at moment t, $T_n(t)$ represents a temperature of the heating medium of different branches after mixing at the corresponding node at moment t, wherein n represents a node where different branches mix, $T_{in}(t)$ represents a temperature of the heating medium of different branches before mixing at the corresponding node at moment t, when the tail end temperatures $T_{out}(t)$ replaces the $T_{in}(t)$, the temperature mixing constraint is expressed by a matrix of:

$$\text{diag}(A_f M(t))T_n(t)=A_t\text{diag}(M(t))T_{out}(t)$$

where, $A_f$ represents a positive node-branch association matrix,
$A_t$ represents a negative node-branch association matrix,
diag(•) represents a diagonal, namely:

$$A_{fij} = \begin{cases} 1 & \text{node } i \text{ is a head node of pipeline or branch } j \\ 0 & \text{node } i \text{ is not a head node of pipeline or branch } j \end{cases}$$

$i = 1, 2, \ldots, N; j = 1, 2, \ldots, B$ $$A_{tij} = \begin{cases} 1 & \text{node } i \text{ is a tail node of pipeline or branch } j \\ 0 & \text{node } i \text{ is not a tail node of pipeline or branch } j \end{cases}$$

$i = 1, 2, \ldots, N; j = 1, 2, \ldots, B$

N represents the number of the nodes in the heating system, and
B represents the number of the pipelines and equivalent branches in the heating system.

6. The method of claim 3, wherein the temperature transfer relationship constraint is denoted as:

$$T_{i+1}^b(t) - T_a = \frac{1}{1+a\Delta t}\left[(1-r)\cdot\left(T_{i+1}^b(t-1)-T_a\right)+r\left(T_i^b(t-1)-T_a\right)\right]$$

$(i = 1, 2, 3, \ldots, Z^b; b = 1, 2, 3, \ldots, Y)$ $$a = \frac{\lambda}{\rho \cdot C_p \cdot S}$$

where, $T_{i+1}^b(t)$ represents a temperature of a pipeline numbered as b at a state point i at moment t+1,
$T_a$ represents an ambient temperature,
$T_i^b(t)$ represents a temperature of a pipeline numbered as b at a state point i at moment t,
$T_0^b(t)$ represents a temperature of a pipeline numbered as b at a head end at moment t,
$T_z^b(t)$ represents a temperature of a pipeline numbered as b at a tail end at moment t,
l represents a length of the branch in the heating system,
λ represents the heat dissipation coefficient of the pipeline in the heating system,
r represents a grid ratio of a discrete difference form, from moment $t_1$ to moment $t_n$, there is an interval of Δt, and
Y represents a number of pipelines.

7. The method of claim 2, further comprising:
obtaining a set of estimated results $x_{para,1}$, $x_{para,2}$, ..., $x_{para,s}$; and
obtaining an average by a formula of:

$$x_{para,final} = \frac{1}{s}\times(x_{para,1}+x_{para,2}+\ldots+x_{para,s}),$$

where $x_{para,final}$ is used as the system parameters.

8. An apparatus for controlling a heating system, comprising:
a processor; and
a memory for storing instructions executable by the processor;
wherein the processor is configured to carry out:
establishing an objective function and constraints for estimating system parameters of the heating system, in which the heating system comprises nodes, pipelines and equivalent branches, the equivalent branch is configured to represent a heating resource or a heating load in the heating system, the system parameters comprise a resistance coefficient of each of the pipelines and equivalent branches, and a heat dissipation coefficient of each of the pipelines;
solving the objective function based on the constraints to obtain the system parameters;
modeling the heating system based on the obtained system parameters to obtain control parameters of the heating system; and
controlling the heating system based on the control parameters;
wherein establishing the objective function by a formula of:

$$\min J(x_h(t)) = \min \sum_{t=t_{D-1}}^{t_{D-1}} \left\{[z_h(t)-f(x_h(t))]^T W[z_h(t)-f(x_h(t))]\right\}$$

where, $J(x_h(t))$ represents the objective function at moment t,
$x_h(t)$ represents a column vector of state variables in the heating system and the system parameters at moment t, wherein h represents the state variables and the system parameters,
$z_h(t)$ represents a column vector of observed values of the state variables and the system parameters at moment t,
$f(x_h(t))$ represents a column vector of estimated values of the state variables and the system parameters at moment t,
D represents a time window,
I represents a size of the time window,
T represents a matrix transposition operation, and
W represents a covariance matrix of the observed values;
where $f(x_h(t))$ is denoted by a formula of:

$$A^T H(t)=\Delta H(t)-H_p(t),$$

$$\phi^q(t)=C_p m^q(t)(T_f^q(t)-T_t^q(t)),$$

where, $A^T$ represents a transposition of a node-branch association matrix A,
H(t) represents a column vector formed by a pressure of each node at moment t,
ΔH(t) represents a column vector formed by a pressure loss of each of the pipelines and equivalent branches at moment t, in which ΔH(t)=K·m(t)·|m(t)|, K represents a column vector formed by the resistance coefficient of each of the pipelines and equivalent branches, m(t) represents a column vector formed by a flow of each of the pipelines and equivalent branches at moment t, |m(t)| represents a column vector formed by an absolute value of the flow of each of the pipelines and equivalent branches at moment t,
$H_p(t)$ represents a column vector formed by a pump head of each of the pipelines and equivalent branches at moment t, in which $H_p(t)=a(m_p(t))^2+bm_p(t)+c$, a, b, and c are pump parameters, $m_p(t)$ represents a flow of the branch where the pump is located, wherein p represents the branch where the pump is located, $\phi^q(t)$ represents a thermal power of each equivalent branch at moment t, in which the superscript q represents the equivalent branch, the thermal power of the heating source is positive, and the thermal power of the heating load is positive, $C_p$ represents a specific heat capacity of a heating medium flowing in the heating system, $m^q(t)$ represents a flow of each equivalent branch at moment t, $T_f^q(t)$ represents a head end temperature of each equivalent branch at moment t, and $T_t^q(t)$ represents a tail end temperature of each equivalent branch at moment t;

wherein the control parameters of the heating system comprise a flow of each of the pipelines and equivalent branches at a control moment, a thermal power of each of the pipelines and equivalent branches at a control moment, and temperature of each of the pipelines and equivalent branches at a control moment.

9. The apparatus of claim 8, wherein:

the column vector $x_h(t)$ comprises a state column vector $x_{state}(t)$ and a parameter column vector $x_{para}$, the state column vector $x_{state}(t)$ comprises a flow m(t) of each of the pipelines and equivalent branches, a pressure H(t) of each node, and temperatures $T_i^b(t)$, i=0, 1, 2, ..., $Z^b$ of each of the pipelines, wherein superscript b represents a pipeline numbering reference, each pipeline b is divided into $Z^b$ segments as internal state points, the internal state points in each pipeline b are numbered as i=0, 1, 2, 3, ..., $Z^b$, and $Z^b$ represents a number of state points in each pipeline b, and the parameter column vector $x_{para}$ comprises the resistance coefficient K(t) of each of the pipelines and equivalent branches and the heat dissipation coefficient $\lambda^p$ of branches including water supply branches and water return branches, wherein superscript p represents a branch including a water supply branch and a water return branch.

10. The apparatus of claim 9, wherein the constraints comprise a flow continuity constraint for the nodes, a temperature mixing constraint for the nodes, and a temperature transfer relationship constraint.

11. The apparatus of claim 10, where the flow continuity constraint is denoted as:

$$AM(t)=0$$

where, M(t) represents a column vector formed by the flow of the pipelines and equivalent branches, $$M(t) = \begin{bmatrix} M^p(t) \\ M^q(t) \end{bmatrix}$$

$M^p(t)$ represents a column sub vector formed by the flow of the pipelines at moment t, $M^q(t)$ represents a column sub vector formed by the flow of the equivalent branches at moment t.

12. The apparatus of claim 10, wherein the temperature mixing constraint is denoted as:

$$(\Sigma m_{out}(t))T_n(t)=\Sigma(m_{in}(t)T_{in}(t))$$

where, $m_{out}(t)$ represents a flow of each of the pipelines and equivalent branches where the heating medium flows out of a corresponding node at moment t, $m_{in}(t)$ represents a flow of each of the pipelines and equivalent branches where the heating medium flows into the corresponding node at moment t, $T_n(t)$ represents a temperature of the heating medium of different branches after mixing at the corresponding node at moment t, wherein n represents a node where different branches mix, $T_{in}(t)$ represents a temperature of the heating medium of different branches before mixing at the corresponding node at moment t, when the tail end temperatures $T_{out}(t)$ replaces the $T_{in}(t)$, the temperature mixing constraint is expressed by a matrix of:

$$\text{diag}(A_f M(t))T_n(t)=A_t \text{diag}(M(t))T_{out}(t)$$

where, $A_f$ represents a positive node-branch association matrix, $A_t$ represents a negative node-branch association matrix, diag(•) represents a diagonal, namely:

$$A_{fij} = \begin{cases} 1 & \text{node } i \text{ is a head node of pipeline or branch } j \\ 0 & \text{node } i \text{ is not a head node of pipeline or branch } j \end{cases},$$
$$i = 1, 2, \ldots, N; \quad j = 1, 2, \ldots, B$$

$$A_{tij} = \begin{cases} 1 & \text{node } i \text{ is a tail node of pipeline or branch } j \\ 0 & \text{node } i \text{ is not a tail node of pipeline or branch } j \end{cases},$$
$$i = 1, 2, \ldots, N; \quad j = 1, 2, \ldots, B$$

N represents the number of the nodes in the heating system, and

B represents the number of the pipelines and equivalent branches in the heating system.

13. The apparatus of claim 10, wherein the temperature transfer relationship constraint is denoted as:

$$T_{i+1}^b(t) - T_a = \frac{1}{1+a\Delta t}\left[(1-r)\cdot\left(T_{i+1}^b(t-1)-T_a\right)+r\left(T_i^b(t-1)-T_a\right)\right]$$

$$(i = 1, 2, 3, \ldots, Z^b; b = 1, 2, 3, \ldots, Y)$$

$$a = \frac{\lambda}{\rho \cdot C_p \cdot S}$$

where, $T_{i+1}^b(t)$ represents a temperature of a pipeline numbered as b at a state point i at moment t+1, $T_a$ represents an ambient temperature, $T_i^b(t)$ represents a temperature of a pipeline numbered as b at a state point i at moment t, $T_0^b(t)$ represents a temperature of a pipeline numbered as b at a head end at moment t, $T_z^{b(t)}$ represents a temperature of a pipeline numbered as b at a tail end at moment t, l represents a length of the branch in the heating system, λ represents the heat dissipation coefficient of the pipeline in the heating system, r represents a grid ratio of a discrete difference form, from moment $t_1$ to moment $t_n$, there is an interval of Δt, and Y represents a number of pipelines.

14. A non-transitory computer-readable storage medium having stored therein instructions that, when executed by a processor of a terminal, causes the terminal to perform a method for controlling a heating system, the method comprising:

establishing an objective function and constraints for estimating system parameters of the heating system, in which the heating system comprises nodes, pipelines and equivalent branches, the equivalent branch is configured to represent a heating resource or a heating load in the heating system, the system parameters comprise a resistance coefficient of each of the pipelines and equivalent branches, and a heat dissipation coefficient of each of the pipelines;

solving the objective function based on the constraints to obtain the system parameters;

modeling the heating system based on the obtained system parameters to obtain control parameters of the heating system; and controlling the heating system based on the control parameters, wherein establishing the objective function by a formula of:

$$\min J(x_h(t)) = \min \sum\nolimits_{t=t_{D-I}}^{t_{D-1}} \left\{ [z_h(t) - f(x_h(t))]^T W [z_h(t) - f(x_h(t))] \right\}$$

where, $J(x_h(t))$ represents the objective function at moment t, $x_h(t)$ represents a column vector of state variables in the heating system and the system parameters at moment t, wherein h represents the state variables and the system parameters, $z_h(t)$ represents a column vector of observed values of the state variables and the system parameters at moment t, $f(x_h(t))$ represents a column vector of estimated values of the state variables and the system parameters at moment t, D represents a time window, I represents a size of the time window, T represents a matrix transposition operation, and W represents a covariance matrix of the observed values, where $f(x_h(t))$ is denoted by a formula of:

$A^T H(t) = \Delta H(t) - H_p(t)$, $\phi^q(t) = C_p m^q(t)(T_f^q(t) - T_t^q(t))$, where, $A^T$ represents a transposition of a node-branch association matrix A, H(t) represents a column vector formed by a pressure of each node at moment t, $\Delta H(t)$ represents a column vector formed by a pressure loss of each of the pipelines and equivalent branches at moment t, in which $\Delta H(t) = K \cdot m(t) \cdot |m(t)|$, K represents a column vector formed by the resistance coefficient of each of the pipelines and equivalent branches, m(t) represents a column vector formed by a flow of each of the pipelines and equivalent branches at moment t, |m(t)| represents a column vector formed by an absolute value of the flow of each of the pipelines and equivalent branches at moment t, $H_p(t)$ represents a column vector formed by a pump head of each of the pipelines and equivalent branches at moment t, in which $H_p(t) = a(m_p(t))^2 + bm_p(t) + c$, a, b, and c are pump parameters, $m_p(t)$ represents a flow of the branch where the pump is located, wherein p represents the branch where the pump is located, $\phi^q(t)$ represents a thermal power of each equivalent branch at moment t, in which the superscript q represents the equivalent branch, the thermal power of the heating source is positive, and the thermal power of the heating load is positive, $C_p$ represents a specific heat capacity of a heating medium flowing in the heating system, $m^q(t)$ represents a flow of each equivalent branch at moment t, $T_f^q(t)$ represents a head end temperature of each equivalent branch at moment t, and $T_t^q(t)$ represents a tail end temperature of each equivalent branch at moment t;

wherein the control parameters of the heating system comprise a flow of each of the pipelines and equivalent branches at a control moment, a thermal power of each of the pipelines and equivalent branches at a control moment, and temperature of each of the pipelines and equivalent branches at a control moment.

* * * * *